United States Patent
Kameyama

(10) Patent No.: US 7,421,142 B2
(45) Date of Patent: Sep. 2, 2008

(54) METHOD OF AND SYSTEM FOR IMAGE PROCESSING AND COMPUTER PROGRAM

(75) Inventor: Hirokazu Kameyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 477 days.

(21) Appl. No.: 11/270,588

(22) Filed: Nov. 10, 2005

(65) Prior Publication Data

US 2006/0098257 A1  May 11, 2006

(30) Foreign Application Priority Data

Nov. 10, 2004   (JP)   ............................. 2004/326333

(51) Int. Cl.
   B06K 9/40   (2006.01)
   B06K 9/00   (2006.01)
   G06K 9/38   (2006.01)
(52) U.S. Cl. ...................................... 382/254; 382/167
(58) Field of Classification Search ................. 382/254, 382/270, 274, 275, 167
   See application file for complete search history.

(56) References Cited

U.S. PATENT DOCUMENTS 6,195,473 B1 * 2/2001 Zable et al. ................. 382/299
6,579,239 B1 * 6/2003 Avinash et al. .............. 600/443

FOREIGN PATENT DOCUMENTS

JP   2002-171408 A   6/2002

* cited by examiner

Primary Examiner—Yon Couso
(74) Attorney, Agent, or Firm—Sughrue Mion, PLLC

(57) ABSTRACT

In an image processing method for carrying out an image quality correction for correcting an image quality on each of a plurality of images in an image group to obtain corrected images, an image processing method includes the steps of carrying out a temporary image quality correction for correcting an image quality on each images in the image group to obtain a temporarily corrected image. A characteristic value representing an image quality for each temporarily corrected image is calculated and a target characteristic value is calculated so that dispersion of each characteristic value to the target characteristic value is minimized on the basis of the characteristic value of each temporarily corrected image. A correction value of each of the plurality of images in the image group which corrects the characteristic value thereof to the target characteristic value is obtained, and the image is corrected with the correction value.

6 Claims, 2 Drawing Sheets

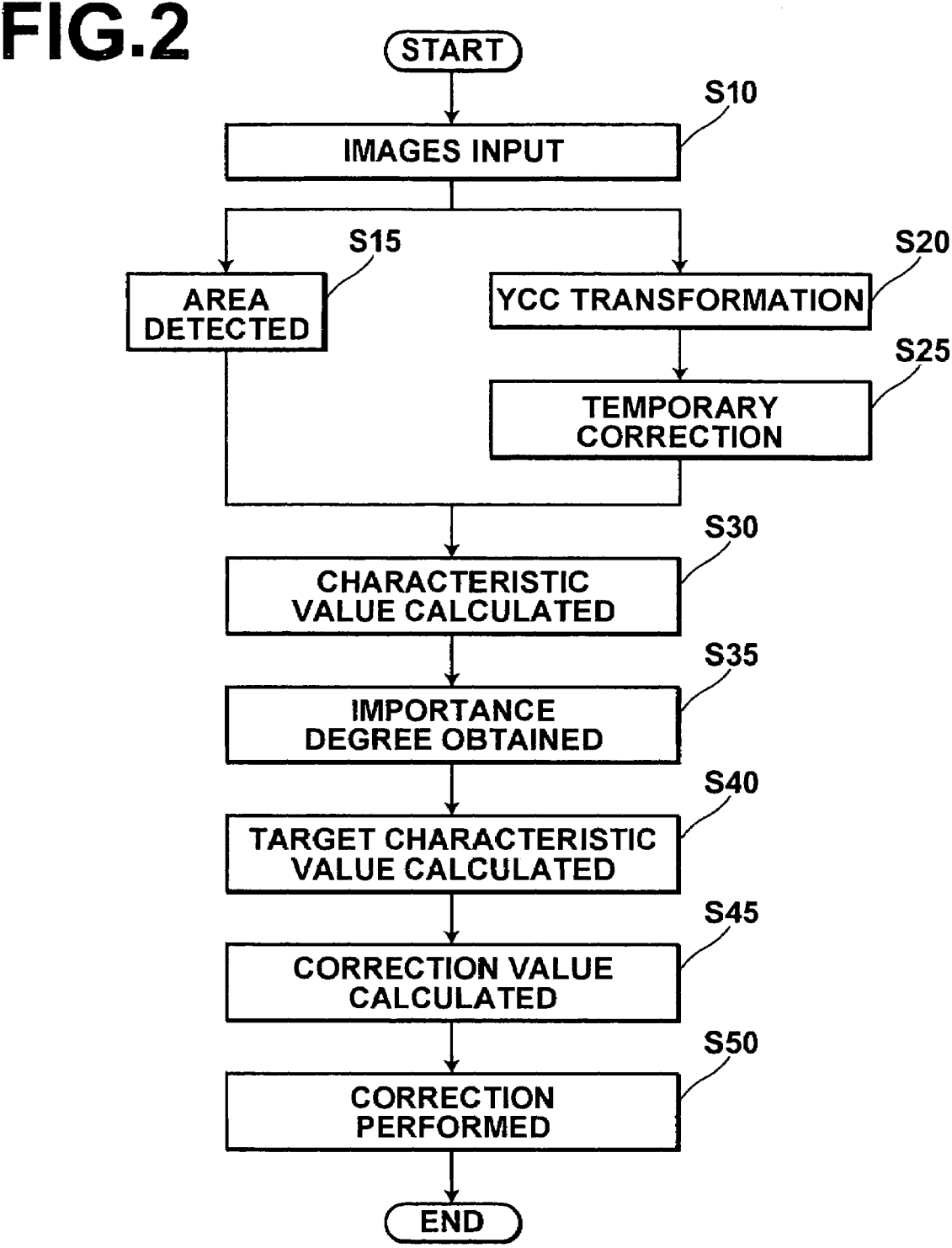

METHOD OF AND SYSTEM FOR IMAGE PROCESSING AND COMPUTER PROGRAM

BACKGROUND OF THE INVENTION

1. Field of the Invention

This invention relates to a method of and system for image processing for correcting predetermined image quality of images forming an image group, and a computer program for the image processing.

2. Description of the Related Art

Recently, digital images (will be simply referred to as "an image", hereinbelow) such as those obtained by photoelectrically reading a picture recorded on a photographic film such as negative film or color reversal film by a reading system such as a scanner or those obtained by taking an image with a digital still camera (DSC) are displayed or printed after correction of image quality thereof, such as brightness, contrast, or white balance. When the image quality is corrected, for instance, when the brightness is corrected, the correction is generally made on the basis of the average brightness of the image before the correction. Accordingly, even images representing continuous scenes or similar scenes such as those in which the objects or the backgrounds are the same can be differently finished when the taking conditions are slightly different. Further, for instance, when graduation albums are to be prepared, portraits of alumni are printed after correction in their qualities. In this case, when each of the portraits looks differently by the quality correction, a sense of incompatibility can be provided to a viewer on the whole. Accordingly, it is desired that the portraits after correction are uniform in brightness, contrast, white balance or the like.

In order to unify the images after correction of the quality, there has been proposed in Japanese Unexamined Patent Publication No. 2002-171408 a method in which the user is caused to designate a reference corrected image out of a plurality of corrected images and the corrected images other than the designated reference corrected image are further corrected to conform to the designated reference corrected image so that the corrected images in an image group have a uniform image quality. By this, since each of the corrected images is corrected to have an image quality equal to the designated reference corrected image, corrected images can have uniform image qualities.

However, the method disclosed in Japanese Unexamined Patent Publication No. 2002-171408 is disadvantageous in that it involves a problem that the image quality of each of the images can deteriorate if a wrong reference image is designated though the images can be unified in the image quality since it is difficult to designate an adequate image as the reference image unless a skilled user, in addition to a problem that it takes long time since it requires designation of the reference image by the user.

SUMMARY OF THE INVENTION

In view of the foregoing observations and description, the primary object of the present invention is to provide an image processing method, an image processing system and a computer program for the purpose which can adequately and efficiently unify the images after correction in the image quality.

In accordance with the present invention, there is provided an image processing method, in an image processing method for carrying out a predetermined image quality correction for correcting a predetermined image quality on each of a plurality of images in an image group to obtain respective corrected images, comprising the steps of carrying out a predetermined temporary image quality correction for correcting the predetermined image quality on each of a plurality of images in the image group to obtain temporarily corrected image of the image, calculating a characteristic value representing the predetermined image quality for each temporarily corrected image, calculating a target characteristic value so that dispersion of each characteristic value to the target characteristic value is minimized on the basis of the characteristic value of each temporarily corrected image, obtaining a correction value of each of the plurality of images in the image group which corrects the characteristic value thereof to the target characteristic value, and correcting the image with the correction value.

In accordance with the present invention, there is further provided an image processing system, in an image processing system for carrying out a predetermined image quality correction for correcting a predetermined image quality on each of a plurality of images in an image group to obtain respective corrected images, comprising a temporary correction means which carries out a predetermined temporary image quality correction for correcting the predetermined image quality on each of a plurality of images in the image group to obtain temporarily corrected image of the image, a characteristic value calculating means which calculates a characteristic value representing the predetermined image quality for each temporarily corrected image, a target characteristic value calculating means which calculates a target characteristic value so that dispersion of each characteristic value to the target characteristic value is minimized on the basis of the characteristic value of each temporarily corrected image, a correction value calculating means which obtains a correction value of each of the plurality of images in the image group which corrects the characteristic value thereof to the target characteristic value, and a correction performing means which corrects the image with the correction value.

The "image group" means a set of images which are to be unified in the image quality after correction.

The "plurality of images in the image group" on which the temporary correction is to be carried out means two or more images and, though may be of a preset number, it is preferred that the number of the plurality of images depends upon the total number of the images in the image group, for instance, one third of the total number of the images in the image group. Further, the plurality of images may be selected, for instance, in the order of input of the images, or by sampling at predetermined intervals in the order of input of the images.

Further, the "dispersion of each characteristic value to the target characteristic value" means a sum of values which can represent the difference between the target characteristic value and the characteristic value, and may be a sum of the absolute values of the differences between the target characteristic value and the characteristic values, or a sum of the squares of the differences between the target characteristic value and the characteristic values.

The target characteristic value can be calculated so that dispersion of each characteristic value to the target characteristic value is minimized, for example, by employing a method according to the kind of the dispersion. For example, when the dispersion represents a sum of the squares of the differences between the target characteristic value and the characteristic values, the target characteristic value may be calculated by a least squares method, whereas when the dispersion represents a sum of the absolute values of the differences between the target characteristic value and the characteristic values, the target characteristic value may be an average of the characteristic values.

Further, there is a demand that specific areas of the corrected images, that is, only the representative areas, are unified in image quality according to, for instance, the application of the corrected images instead of unifying images in the image quality of the whole image, for instance, that the areas of the background of the corrected images are unified when an album of a school trip is made, or the areas of the face are unified apart from the areas of the background when a graduation album is made. In order to meet this demand, the characteristic value calculating means calculates the characteristic values of the representative areas in the temporarily corrected images and the target characteristic value calculating means calculates the target characteristic value on the basis of the characteristic values of the representative areas and the correction value calculating means obtains a correction value of each of the plurality of images in the image group which corrects the characteristic value of the representative area in the corrected image to the target characteristic value.

The correction performing means which corrects the image with the correction value may corrects by applying the correction value only to the representative area with the areas other than the representative area not corrected, or may correct all the areas with different correction values. However, it is preferred that also the areas other than the representative area be corrected on the basis of the correction value for the representative area, that is, the whole image be corrected with the correction value obtained for the representative area, in order to prevent generation of unevenness in corrected image due to different correction values used in areas of the image and to shorten the processing time.

Further, there is a demand that instead of unifying image qualities of only areas of the face or the background, a plurality of representative areas of the images are unified to a different degree. For example, there is a demand that the areas of the face should be unified while the areas of the background should be unified to some extent. In one embodiment, the image processing system of the present invention is further provided with an importance degree obtaining means which obtains the degrees of importance of representative areas in the image, and the characteristic value calculating means calculates the characteristic values by the plurality of representative areas of the temporarily corrected images, the target characteristic value calculating means calculates the target characteristic values by the plurality of representative areas of the temporarily corrected images, the correction value calculating means obtains a first correction value of each of the representative areas so that the characteristic value of the representative area in the corrected image becomes the target characteristic value thereof, and weights the first correction value with a weight coefficient according to the degree of importance of the representative area corresponding to the first correction value to calculate a second correction value, and a correction performing means corrects the image with the second correction value.

The term "the degree of importance of a representative area" corresponds to the extent to which the image qualities of the representative areas are to be unified. For example, when the areas of the face should be mainly unified while the areas of the background should be unified to some extent though not to extent of the areas of the face, the degree of importance of the areas of the face may be set to 0.7 while the degree of importance of the areas of the background may be set to 0.3. The importance degree obtaining means which obtains the degrees of importance of the representative areas may be an input means to cause the user to input the degree of importance or may comprise a storage means which stores in advance the degrees of importance of a plurality of representative areas and a read-out means which reads out the degree of importance for the area from the storage means. Further, the importance degree obtaining means may set the degree of importance according to the kind of images in the image group. For example, the importance degree obtaining means may set the degree of importance of the areas of face higher than that of areas of background when the images in the image group are of a portrait scene, while the importance degree obtaining means may set the degree of importance of the areas of background higher than that of areas of face when the images in the image group are of a landscape scene. In this case, the kind of images may be input by the user or may be obtained through an analysis of the images.

Further, when there are a plurality of representative areas different in the degree of importance, the target characteristic value calculating means may calculate the target characteristic value by the representative areas so that dispersion to the target characteristic value of the characteristic value of the corresponding representative area in the temporarily corrected image is minimized. However, in order to obtain a better unifying effect, it is preferred that the target characteristic value calculating means calculates the target characteristic value of the representative areas so that the sum of dispersion to the target characteristic value of the characteristic value of the corresponding representative area in the temporarily corrected image, weighted with a weight coefficient according to the degree of importance of the area, is minimized.

The image processing method of the present invention may be recorded in a computer-readable medium as a computer program, and the computer-readable medium may be provided together with the computer program. A skilled artisan would know that the computer-readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In the image processing method and system of the present invention, an image quality correction is first carried out on a plurality of images forming an image group to obtain temporarily corrected images. Then the characteristic values of the temporarily corrected images are obtained and a target characteristic value which minimizes dispersion of the characteristic values is calculated. At the same time, a correction value which corrects the characteristic value of each of the plurality of images in the image group to the target characteristic value is calculated, and the image is corrected with the correction value. With this arrangement, a long time is not required since it does not require designation of the reference image by the user unlike the prior art. Further, since the target characteristic value is calculated from the corrected images and the correction value is obtained on the basis of the target characteristic value, the image qualities after correction can be improved and unified.

BRIEF DESCRIPTION OF THE DRAWINGS

FIG. 2 is a flow chart for illustrating the processing in the image processing system shown in FIG. 1.

DESCRIPTION OF THE PREFERRED EMBODIMENT

Figure 1:
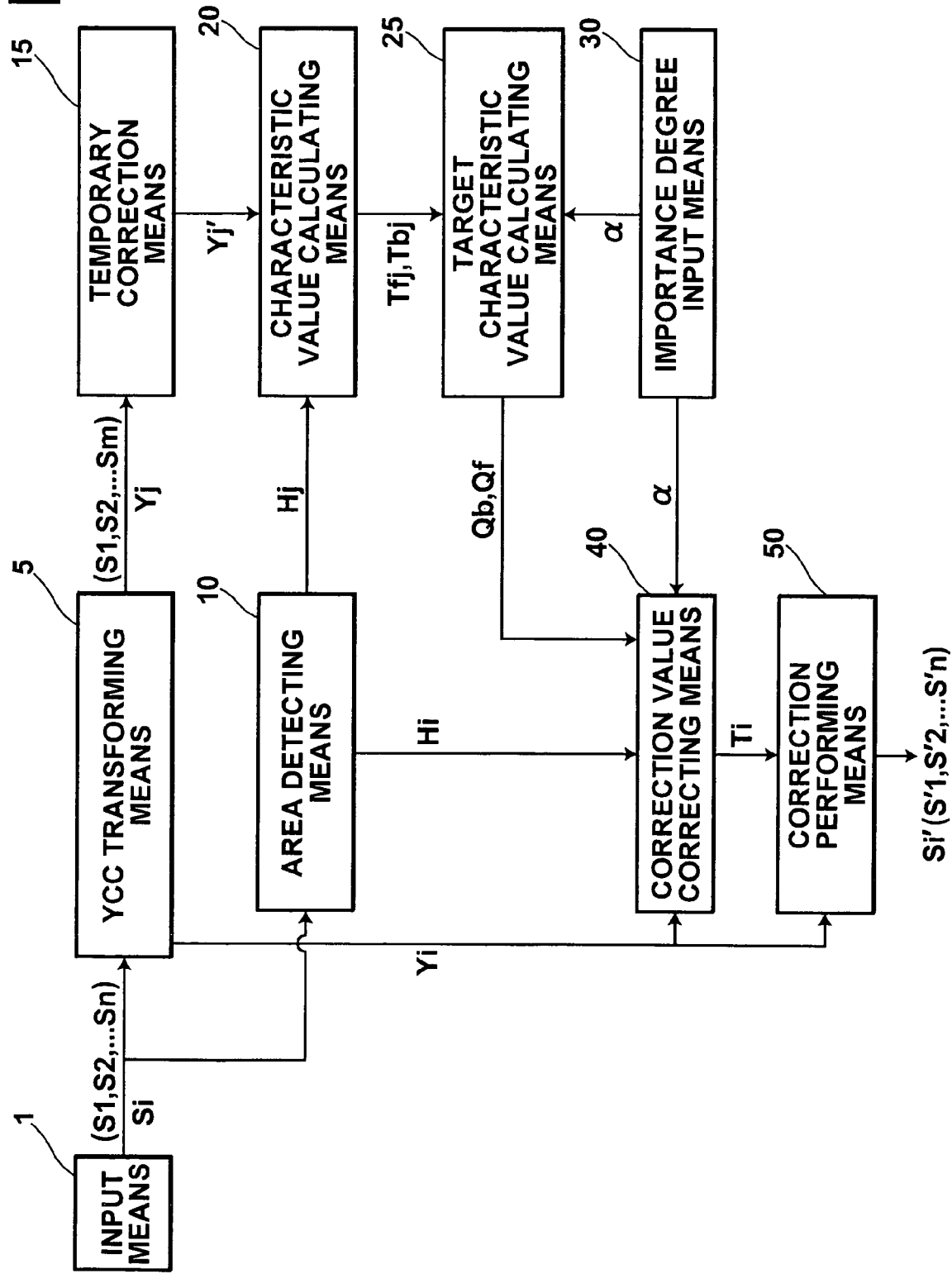
FIG. 1 is a block diagram of an image processing system in accordance with an embodiment of the present invention.

FIG. 1 is a block diagram of an image processing system in accordance with an embodiment of the present invention. In the image processing system of this embodiment, a plurality of certification photographs are corrected and the corrected certification photographs are unified in the image qualities. This is done by performing a processing computer program read in the storage unit (e.g. a personal computer) on the computer. The processing computer program is stored in an information storage medium such as a CD-ROM or distributed by way of a network such as Internet and then installed in a computer.

In the following description, image data sometimes means an image, and description will be made without distinction of the image data and the image.

As shown in FIG. 1, the image processing system of this embodiment comprises an input means 1 for inputting an image group comprising a plurality of certification photographs Si (S1, S2, . . . ,Sn), a YCC transformation means 5 which carries out YCC transformation on each of the photographs Si in the image group to obtain brightness component of each photograph, a temporary correction means 15 which carries out temporary brightness correction on brightness image of m photographs out of the n photographs Si (S1, S2, . . . ,Sn) (m<n) to obtain temporarily corrected images Y'j (Y'1, Y'2, . . . ,Y'm), an area detecting means 10 which detects the area of background and the area of face of each of the images in the image group and obtains area information H representing positions of the areas of face and background by the photographs, a characteristic value calculating means 20 which calculates characteristic values (an average brightness Tfj or Tbj here) of the area of face and the area of background by the temporarily corrected images Y' on the basis of the area information H (here Hj:H1, H2, . . . , Hm) obtained by the area detecting means 10, a target characteristic value calculating means 25 which calculates target characteristic values Qf and Qb of the area of face and the area of background by the use of the characteristic values calculated by the characteristic value calculating means 20 and the degree of importance α of the area of background input through an importance degree input means 30 to be described later, a correction value calculating means 40 which calculates the correction value Ti of each of the images in the image group, and a correction performing means 50 which corrects the corresponding images with the correction values obtained by the correction value calculating means 40 to obtain corrected images S'i (S'1, S'2, . . . ,S'n).

The input means 1 is for inputting an image group comprising a plurality of certification photographs Si, and may comprise, for instance, a receiving portion which receives photographs transferred through the network, a read-out portion which reads out photographs from a recording medium such as a CD-ROM, or a scanner which obtains images by photoelectrically reading out photographs printed on a printing medium from a printing medium such as paper or photographic paper.

The YCC transformation means 5 transforms the R, G, B values to brightness Y, and color differences Cb and Cr according to the following formulae (1).

$Y=0.299 \times R+0.587 \times G+0.114 \times B$ $Cr=0.500 \times R-0.419 \times G-0.0081 \times B$ $Cb=-0.169 \times R-0.331 \times G+0.500 \times B$ (1)

wherein Y represents the brightness, Cr and Cb represent the color differences, and R, G and B represent the R, G, B values.

Though the image processing method and system of the present invention can be applied to any image quality correction including brightness correction, γ-correction, contrast correction, and white balance correction, the image processing system of this embodiment is for carrying out the brightness correction by way of example. Accordingly, the temporary correction means 15 carries out temporary brightness correction on brightness image of m photographs (will be referred to as "sample images", hereinbelow) out of the n photographs Si in the image group to obtain temporarily corrected images Y'j (Y'1, Y'2, . . . ,Y'm). In this particular embodiment, the temporary correction means 15 extracts sample images at sampling intervals of three, e.g., first, fourth, seventh, . . . , from the n photographs Si in the image group and carries out temporary brightness correction on the extracted sample images.

The temporary correction means 15 carries out the temporary correction on the brightness components Yj of each of the sample images according to the following formulae (2).

$\Delta Yj = Ymid/Yav(j)$ $Y'j = Yj \times \Delta Yj$ (2)

wherein Ymid represents a constant on the number of bits of the sample images, e.g., when the sample image is of 8 bits, the Ymid may be, for instance, 128, Yav(j) represents an average brightness of the sample images, ΔYj represents the correction value for the sample image Yj and Y'j represents the brightness of the corrected image Y'j.

The area detecting means 10 detects the area of background and the area of face of each of the photographs Si (S1, S2, . . . ,Sn) in the image group and obtains area information H representing positions of the areas of face and background. Then the area detecting means 10 provides the area information H to the characteristic value calculating means 20 and the correction value calculating means 40. Though the area detecting means 10 may be any so long as it can obtain the area information H from the photographs Si, in the image processing system of this embodiment, since the certification photographs are to be processed, the background color information representing the color of the background (e.g., blue in the case of a blue background) is registered in advance in a storage means which is not shown, and the area detecting means 10 takes as the area of background the area having a color similar to the color of the background on the basis of the background color information registered in the storage means, and takes as the area of face the area other than the area of background, thereby detecting the areas of face and background and obtaining the area information H.

The characteristic value calculating means 20 obtains characteristic values (the average brightness Tfj of the area of face and the average brightness Tbj of the area of background, here) by the temporarily corrected images Y'j on the basis of the area information H.

The importance degree input means 30 causes the user to input the degree of importance of each area, that is, the degree to which the image quality is to be unified. In this embodiment, since the representative areas exist in two, the area of face and the area of background, the importance degree input means 30 causes the user to input only the degree of importance α of the area of background and calculates 1−α as the degree of importance of the area of face.

The GUI (graphic user interface) provided to the user by the importance degree input means 30 may be any so long as the user can input the degree of importance α. For example, the degree of importance α a may be input by moving with a mouse a point on a slide bar provided on a display means such as a monitor. When the user does not input, it is assumed that the default degree of importance (α=0) was input.

The target characteristic value calculating means 25 calculates the target characteristic value Qf of the area of face and the target characteristic value Qj of the area of background by the use of the degree of importance α of the area of background input through the importance degree input means 30 and the characteristic values Tfj and Tbj of the temporarily corrected images Y'j obtained by the characteristic value calculating means 20 so that dispersion σ in the following formulae (3) is minimized.

$$\sigma f = \frac{1}{m} \cdot \sum_{j=1}^{m} f(Qf, Tfj) \qquad (3)$$

$$\sigma b = \frac{1}{m} \cdot \sum_{j=1}^{m} f(Qb, Tbj)$$

$$\sigma = (1-\alpha) \cdot \sigma f + \alpha \cdot \sigma b$$

wherein m represents the number of the sample images, α represents the degree of importance of the area of background, each of σf and σb represents the dispersion, Tfj represents the characteristic value of the area of face, Tbj represents the characteristic value of the area of background, Qf represents the target characteristic value of the area of face, Qb represents the target characteristic value of the area of background, and f( ) represents a difference function.

Here, the difference function f(x, y) is a function for obtaining the difference between two parameters, x and y, and may be, for instance, an absolute value of (x−y) or a square of (x−y).

The correction value calculating means 40 calculates a brightness correction value Ti for each of the photographs Si in the image group according to the following formula (4) by the use of the area information H obtained by the area detecting means 10, the degree of importance α input through the importance degree input means 30 and the target characteristic values Qb and Qf obtained by the target characteristic value calculating means 25.

$$Ti=(1-\alpha)\cdot(Qf/Yavf(i))+\alpha\cdot(Qb/Yavb(i)) \qquad (4)$$

wherein Ti represents the correction value for the image Si, α represents the degree of importance of the area of background, Qf represents the target characteristic value of the area of face, Qb represents the target characteristic value of the area of background, Yavf(i) represents the average brightness of the area of face of the image Si, and Yavb (i) represents the average brightness of the area of background of the image Si.

The correction performing means 50 corrects the corresponding image Si with the correction value Ti obtained by the correction value calculating means 40. For example, the correction performing means 50 corrects the brightness component Yi of the image Si according to the following formula (5).

$$Y'i=Yi\times Ti \qquad (5)$$

wherein Y'i represents the brightness of the corrected image S'i, Yi represents the brightness of the image Si, and Ti represents the correction value.

The correction performing means 50 thus obtains the brightness Y'i and at the same time, outputs the image S'i (Y'i, Cbi, Cri) comprising the brightness Y'i and the color differences Cbi and Cri of the image Si corresponding to the brightness Y'I as the corrected image.

FIG. 2 is a flow chart for illustrating the processing in the image processing system shown in FIG. 1. As shown in FIG. 2, in the image processing system of this embodiment, when a plurality of photographs Si (S1, S2, . . . ,Sn) forming the image group are input through the input means 1 (step S10), the area detecting means 10 detects the areas of face and background of each image and obtains area information H representing the areas of face and background of each image (step S15). In parallel to this, the YCC transformation means 5 carries out YCC transformation on each of the photographs Si to obtain a brightness image Yi of each photograph Si (step S20). The temporary correction means 15 selects the sample images Yj (j=1 to m, m<n) from the brightness image Yi (i=1 to n), and carries out the temporary correction on the sample images to obtain temporarily corrected images Y'j (j=1 to m) (step S25). The characteristic value calculating means 20 calculates the average brightness Tfj of the area of face and the average brightness Tbj of the area of background by the temporarily corrected images Y'j (j=1 to m) as the characteristic value of the temporarily corrected images Y'j on the basis of the area information H obtained by the area detecting means 10 (step S30). The target characteristic value calculating means 25 calculates the target characteristic value Qf of the area of face and the target characteristic value Qj of the area of background from the characteristic values Tfj and Tbj of the temporarily corrected images Y'j (j=1 to m) according to the formulae (3) on the basis of the degree of importance α of the area of background input through the importance degree input means 30 (a default value 0 if there is no input) (steps S35 and S40). The correction value calculating means 40 calculates a brightness correction value Ti (i=1 to n) for the brightness image Yi of each of the photographs Si (i=1 to n) in the image group according to the formula (4) by the use of the degree of importance α and the target characteristic values Qb and Qf (step S45). The correction performing means 50 obtains the corrected brightness component Y'i by correcting the corresponding brightness image Yi according to the formula (5) by the use of the correction value Ti obtained by the correction value calculating means 40 and at the same time, outputs the image S'i (Y'i, Cbi, Cri) comprising the corrected brightness component Y'i and the color differences Cbi and Cri of the image Si corresponding to the brightness component Y'I as the corrected image (step S50).

Though, in this embodiment, the images are once transformed to the YCbCr images before the correction, the correction may be carried out directly on the RGB images.

In the image processing system of this embodiment, an image quality correction is first carried out on a part of a plurality of images in the image group to obtain temporarily corrected images. Then the characteristic values of the temporarily corrected images are obtained by the representative areas. At the same time, a target characteristic value for each of representative areas is calculated so that the sum of dispersion to the target characteristic value of the characteristic value of the corresponding representative area weighted with a weight coefficient according to the degree of importance of the area, is minimized, and a correction value of each of the images is calculated on the basis of the target characteristic value. Then, the image is corrected with the correction value. With this arrangement, it is not necessary designation of the reference image by the user in order to unify the image qualities after correction unlike the prior art and the image qualities can be efficiently unified.

Further, since the image qualities are unified according to the degree of importance of the area in the images, the processing can be carried out according to the application and/or the user's taste.

Though a preferred embodiment of the present invention has been described above, the present invention need not be limited to the embodiment described above but may be variously modulated within the spirit of the invention.

For example, though in the embodiment described above, the target characteristic value calculating means 25 calculates the target characteristic value of the area of face and the target characteristic value of the area of background so that the sums of dispersion to the target characteristic values of the characteristic values weighted with a weight coefficient $\alpha$ and $(1-\alpha)$ according to the degrees of importance of the areas is minimized, and the correction value calculating means 40 obtains a first correction value (the part of Qf/Yavf(i) in the formula (4)) of the area of face and a first correction value (the part of Qb/Yavb(i) in the formula (4)) of the area of the background so that the characteristic values in the corrected image becomes the target characteristic values thereof, and weights the two first correction values with weight coefficients according to the degree of importance of the corresponding area, thereby calculating the two first correction values weighted with weight coefficients according to the degree of importance of the corresponding area, the calculation according to the degree of importance may be carried out in one of the target characteristic value calculating means 25 and the correcting value calculating means 30. For example, it is possible that the correction value calculating means carries out the calculation according to the degree of importance as the correction value calculating means 40 in this embodiment while the target characteristic value calculating means obtains the characteristic value of the area of background irrespective the degree of importance so that dispersion to the target characteristic value of each characteristic value of the area of background of the temporarily corrected image is minimized and the characteristic value of the area of face irrespective the degree of importance so that dispersion to the target characteristic value of each characteristic value of the area of face of the temporarily corrected image is minimized, and it is possible that the target characteristic value calculating means carries out the calculation according to the degree of importance as the target characteristic value calculating means 25 in this embodiment while the correction value calculating means obtains the correction value of the area of background and the correction value of the area of face so that the characteristic values of the area of face and the area of background of the corrected image becomes the respective target characteristic values of the area of face and the area of background. In this case, the area of face and the area of background may be corrected with correction values respectively obtained for the area of face and the area of background.

Since the certification photographs are to be processed, in the image processing system of this embodiment, there are two representative areas, i.e., the area of face and the area of background, the image processing method and system of the present invention may be, of course, applied to an image group formed by images having 3 or more representative areas.

Further, the method of detecting the representative area (the area of face and the area of background in this embodiment) need not be limited to that employed in the image processing system of this embodiment.

Though, in the image processing system of this embodiment, the target characteristic value or the correction value of each representative area is calculated on the basis of the degree of importance of the area, when it is desired to unify the image quality of the overall corrected images of the images in the image group, the target characteristic value and/or the correction value may be obtained for the overall images without dividing the images by the areas.

Further, the image processing system of this embodiment is for correcting the brightness, the method, system and computer program of the present invention are suitable for correcting an image quality of any kind other than the brightness including sharpness, gradation, contrast and white balance.

What is claimed is:

1. An image processing method, in an image processing method for carrying out a predetermined image quality correction for correcting a predetermined image quality on each of a plurality of images in an image group to obtain respective corrected images, comprising the steps of carrying out a predetermined temporary image quality correction for correcting the predetermined image quality on each of a plurality of images in the image group to obtain temporarily corrected image of the image, calculating a characteristic value representing the predetermined image quality for each temporarily corrected image, calculating a target characteristic value so that dispersion of each characteristic value to the target characteristic value is minimized on the basis of the characteristic value of each temporarily corrected image, obtaining a correction value of each of the plurality of images in the image group which corrects the characteristic value thereof to the target characteristic value, and correcting the image with the correction value.

2. An image processing system, in an image processing system for carrying out a predetermined image quality correction for correcting a predetermined image quality on each of a plurality of images in an image group to obtain respective corrected images, comprising a temporary correction means which carries out a predetermined temporary image quality correction for correcting the predetermined image quality on each of a plurality of images in the image group to obtain temporarily corrected image of the image, a characteristic value calculating means which calculates a characteristic value representing the predetermined image quality for each temporarily corrected image, a target characteristic value calculating means which calculates a target characteristic value so that dispersion of each characteristic value to the target characteristic value is minimized on the basis of the characteristic value of each temporarily corrected image, a correction value calculating means which obtains a correction value of each of the plurality of images in the image group which corrects the characteristic value thereof to the target characteristic value, and a correction performing means which corrects the image with the correction value.

3. An image processing system as defined in claim 2 in which
the characteristic value calculating means calculates the characteristic values of the representative areas in the temporarily corrected images,
the target characteristic value calculating means calculates the target characteristic value on the basis of the characteristic values of the representative areas and
the correction value calculating means obtains a correction value of each of the plurality of images in the image group which corrects the characteristic value of the representative area in the corrected image to the target characteristic value.

4. An image processing system as defined in claim 3 in which there are a plurality of representative areas and which is further provided with an importance degree obtaining means which obtains the degrees of importance of the representative areas in the image, wherein
the characteristic value calculating means calculates the characteristic values by the plurality of representative areas of the temporarily corrected images,
the target characteristic value calculating means calculates the target characteristic values by the plurality of representative areas of the temporarily corrected images,
the correction value calculating means obtains a first correction value of each of the representative areas so that the characteristic value of the representative area in the corrected image becomes the target characteristic value thereof, and weights the first correction value with a weight coefficient according to the degree of importance of the representative area corresponding to the first correction value to calculate a second correction value, and
a correction performing means corrects the image with the second correction value.

5. An image processing system as defined in claim 4 in which the target characteristic value calculating means calculates the target characteristic value of the representative areas so that the sum of dispersion to the target characteristic value of the characteristic value of the corresponding representative area in the temporarily corrected image, weighted with a weight coefficient according to the degree of importance of the area, is minimized.

6. A computer-readable medium in which a computer program for causing a computer to perform an image processing method, in an image processing method for carrying out a predetermined image quality correction for correcting a predetermined image quality on each of a plurality of images in an image group to obtain respective corrected images, wherein the improvement comprises that the image processing comprises the steps of
carrying out a predetermined temporary image quality correction for correcting the predetermined image quality on each of a plurality of images in the image group to obtain temporarily corrected image of the image,
calculating a characteristic value representing the predetermined image quality for each temporarily corrected image,
calculating a target characteristic value so that dispersion of each characteristic value to the target characteristic value is minimized on the basis of the characteristic value of each temporarily corrected image,
obtaining a correction value of each of the plurality of images in the image group which corrects the characteristic value thereof to the target characteristic value, and correcting the image with the correction value.

* * * * *